United States Patent

Miyamori

(10) Patent No.: US 7,624,346 B2
(45) Date of Patent: Nov. 24, 2009

(54) CONTENTS SUMMARIZING UNIT AND CONTENTS SUMMARIZING PROGRAM THAT PRODUCE CONTENT SUMMARY INFORMATION SUMMARIZED FROM CONTENTS REGARDING SPORTS

(75) Inventor: Hisashi Miyamori, Tokyo (JP)

(73) Assignee: National Institute of Information and Communications Technology Incorporated Administrative Agency, Tokyo (JP)

( * ) Notice: Subject to any disclaimer, the term of this patent is extended or adjusted under 35 U.S.C. 154(b) by 908 days.

(21) Appl. No.: 10/522,242

(22) PCT Filed: Jul. 26, 2002

(86) PCT No.: PCT/JP02/07648

§ 371 (c)(1),
(2), (4) Date: Jan. 25, 2005

(87) PCT Pub. No.: WO2004/012100

PCT Pub. Date: Feb. 5, 2004

(65) Prior Publication Data

US 2005/0262141 A1  Nov. 24, 2005

(51) Int. Cl.
*G06F 15/00* (2006.01)

(52) U.S. Cl. .................................... 715/719
(58) Field of Classification Search .................. 715/719
See application file for complete search history.

(56) References Cited

U.S. PATENT DOCUMENTS 6,751,354 B2 * 6/2004 Foote et al. ................. 382/224
7,055,168 B1 * 5/2006 Errico et al. .................... 725/46
7,203,693 B2 * 4/2007 Carlbom et al. ............. 707/102
7,312,812 B2 * 12/2007 Li et al. ....................... 348/157
7,383,504 B1 * 6/2008 Divakaran et al. ........... 345/440

FOREIGN PATENT DOCUMENTS

JP 2000-261754 9/2000

(Continued)

OTHER PUBLICATIONS

Nepal, et al., "Automatic detection of 'Goal' segments in basketball videos", International Multimedia Conference, vol. 9, p. 261-269, published 2001.*

(Continued)

*Primary Examiner*—Amelia Rutledge
(74) *Attorney, Agent, or Firm*—Westerman, Hattori, Daniels & Adrian, LLP

(57) ABSTRACT

In a contents summarizing unit that extracts a characteristic motion of a player during a match from video contents regarding sports and summarizes it in a required time period so that it can be watched in the required time period, the contents summarizing unit comprises an event information obtaining part that obtains event information such as the characteristic motion of the player during the match from the abovementioned contents, an inside expressing information producing part that produces inside expressing information describing an outline of the match based on the event information, a surface sentence information producing part that produces surface sentence information expressed by a sentence that summarizes the contents based on the inside expressing information, and a contents summary information outputting part that outputs contents summary information wherein the surface sentence information is associated with image information corresponding to the event information.

14 Claims, 7 Drawing Sheets

FOREIGN PATENT DOCUMENTS

| | | |
|---|---|---|
| JP | 2001-92815 | 4/2001 |
| JP | 2001-092815 A | 4/2001 |
| JP | 2001-275058 | 10/2001 |

OTHER PUBLICATIONS

T. Hashimoto et al.; Transactions of Information Processing Society of Japan, vol. 41, No. SIG 3(TOD 6), pp. 71-84, May 15, 2000. Cited in the int'l. search report.

T. Hashimoto et al.; Information Processing Society of Japan Kenkyu Hokoku, vol. 2000, No. 69, pp. 519-526, Jul. 28, 2000. Cited in the int'l. search report.

Y. Shirota et al.; Information Processing Society of Japan Kenkyu Hokoku, vol. 2000, No. 10, pp. 107-112, Jan. 25, 2000. Cited in the int'l. search report.

\* cited by examiner

Fig.3

| Text element for summary ID | Text element for summary |
|---|---|
| 000 | 第 "dai" |
| 001 | set |
| 002 | game |
| 003 | point |
| 004 | player |
| 005 | first half |
| 006 | middle part |
| 007 | last half |
| 008 | が "ga" |
| 009 | は "ha" |
| 010 | を "wo" |
| 011 | に "ni" |
| 012 | で "de" |
| 013 | や "ya" |
| 014 | etc. |
| 015 | from |
| 016 | to |
| 017 | して "shite" |
| ... | ... |
| 988 | manage to |
| 989 | make it through |
| 990 | by a narrow margin |
| 991 | successfully |
| 992 | without precariousness |
| 993 | one-sided |
| 994 | scored |
| 995 | being scored |
| 996 | finally won |
| 997 | being finally won |
| 998 | rallied to overtake |
| 999 | being rallied to overtake |

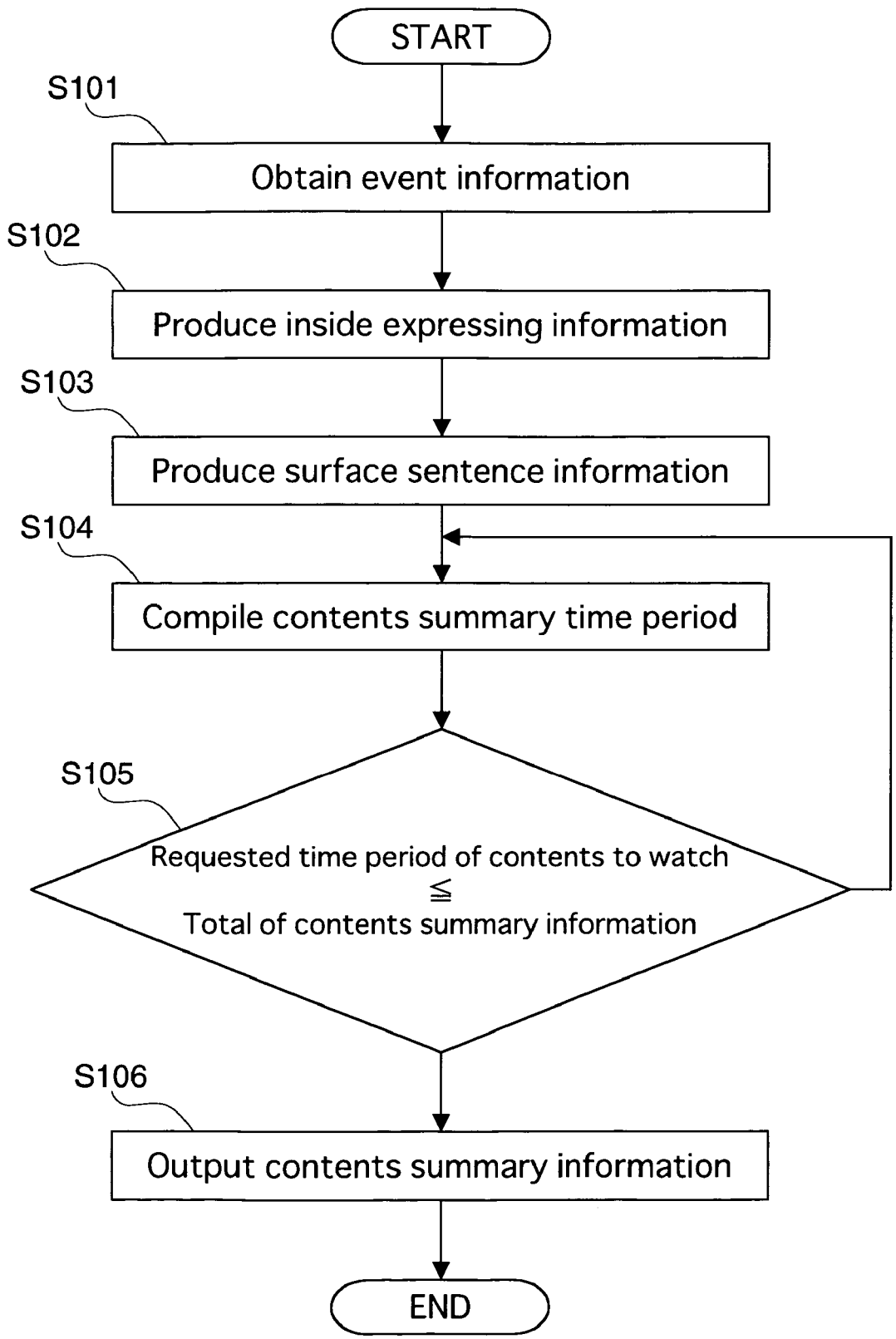

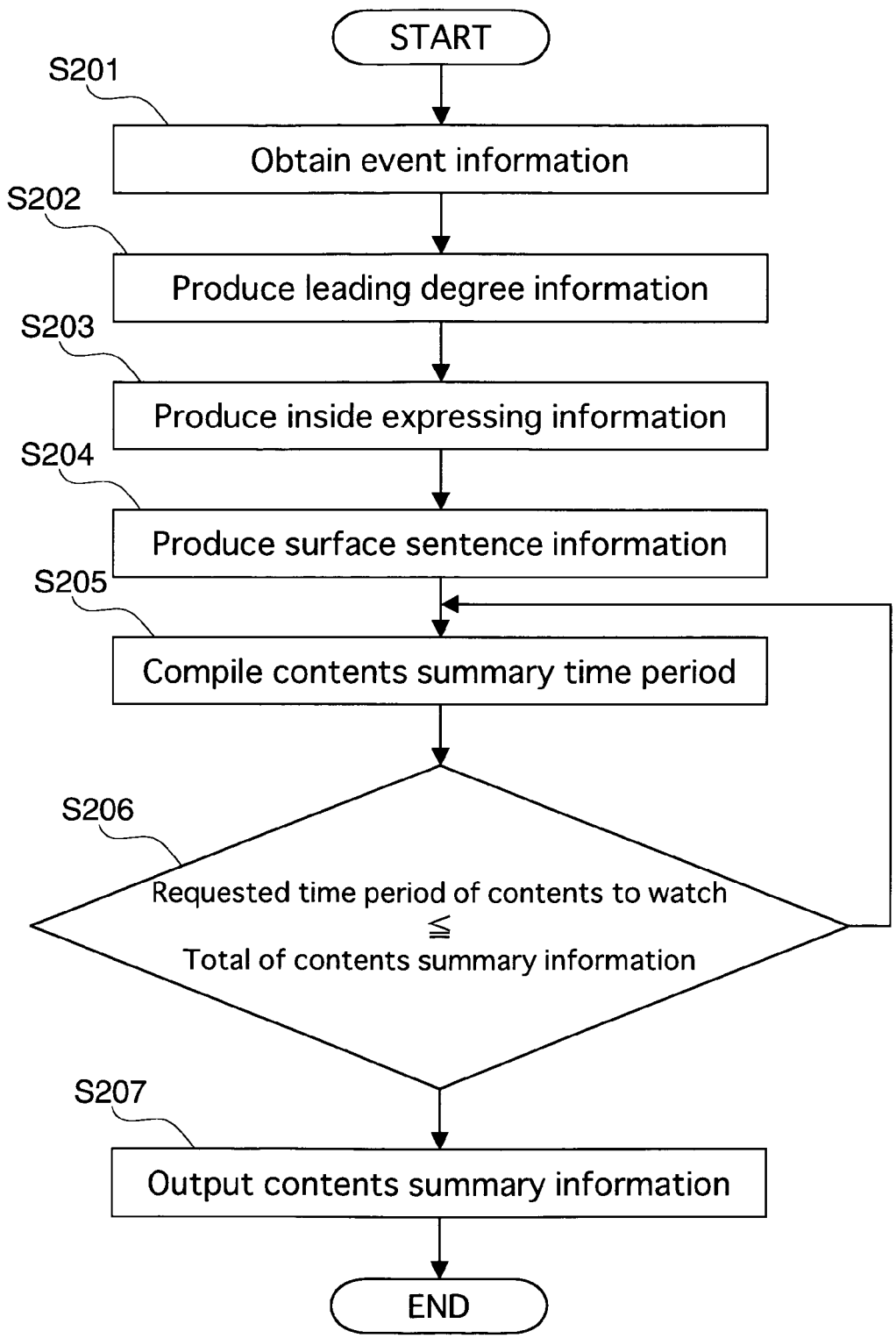

CONTENTS SUMMARIZING UNIT AND CONTENTS SUMMARIZING PROGRAM THAT PRODUCE CONTENT SUMMARY INFORMATION SUMMARIZED FROM CONTENTS REGARDING SPORTS

FIELD OF THE ART

This invention relates to a contents summarizing unit and a contents summarizing program that produce contents summary information summarized from contents regarding sports such as a material image prior to broadcasting, a program that is on the air or an image recorded by a recording media.

BACKGROUND ART

Recently, digital image information that a user can use in various fields has been steadily growing. In conjunction with development of the Internet society, computer equipment, communication environment and/or interface has been speeded up in a broader area, and various image data has been accumulated ubique in large quantity, which gives more importance to image summarizing technology that makes it possible to access flood of information and to watch only a part that a user wants to watch or a highlighted part in a short period of time. This kind of the image summarizing technology can be classified into the following two.

The first technology extracts a low level characteristic amount that is obtained from various media such as a color or texture, a camera work, a face of a person, a caption, nature or magnitude of sound, TFIDF about written data and so on, from an image by means of an automatic analysis, and specifies an important scene by means of these combination or time change, and especially this technology is frequently applied to an image having a structure of a relatively comprehensible context such as news image.

The second technology designs an index in association with the contents to be easily handled by allowing data necessary for summarizing contents to be input by hand to a large extent, and produces and makes use of it, then if once input of the data is completed, the index that expresses a flow of a context or each characteristic scene can be utilized, which makes it possible to summarize the contents that is flexible and that meets a purpose.

However, since the first technology is fundamentally based on a low-level characteristic, it is difficult to specify semantic concrete contents such that what each scene expresses. In addition, in accordance with the second technology, a range to which this technology is applied is limited and this technology requires some artifice to alleviate cost or burden due to manpower.

DISCLOURE OF THE INVENTION

In order to solve the above-mentioned problems, the present claimed invention devices a following means.

More concretely, the present claimed invention is a contents summarizing unit that extracts a characteristic motion of a player during a match from contents regarding sports such as a program that is on the air, a material image prior to broadcasting, an image recorded by a recording media such as a video tape recorder and summarizes it in a required time period so that it can be watched in the required time period, and is characterized by comprising an event information obtaining part that obtains event information such as the characteristic motion of the player during the match from the above-mentioned contents, an inside expressing information producing part that produces inside expressing information describing an outline of the match based on the event information, a surface sentence information producing part that produces surface sentence information expressed by a sentence that summarizes the contents based on the inside expressing information, and a contents summary information outputting part that outputs contents summary information wherein the surface sentence information is associated with image information corresponding to the event information.

In accordance with the arrangement, since the inside expressing information producing part produces the inside expressing information that expresses an outline of the development of the match of the event information such as a characteristic motion of the player during the match obtained by the event information obtaining part, the surface sentence information producing part produces the surface sentence information expressed by a sentence that summarizes the contents based on the inside expressing information, and the contents summary information outputting part outputs the contents summary information wherein the surface sentence information is associated with the image information corresponding to the event information, it is possible to provide the contents summarizing unit that easily produces the contents summary information including semantic contents without unnecessary manpower.

Especially, in order to produce summary information corresponding to an interest or preference of a user, it is preferable that a user information receiving part that receives user information showing an interest or preference of a user is arranged and that the surface sentence information producing part produces the surface sentence information wherein the interest or preference of the user is reflected in the inside expressing information based on the user information.

In order to effectively obtain a sentence that expresses a summarized contents, it is preferable that a text element for summary storing part that stores a text element for summary comprising a word that can express the development of the match or the motion of the player of the contents concerned is comprised and that the surface sentence information producing part produces the surface sentence information based on the text element for summary.

In order to make it possible to grasp a motion of a player or a condition of a match at an arbitrary time during the match, it is preferable that the event information has a hierarchical structure based on a unit that can describe the match such as a structure on a rule of the sports concerned or the motion of the player, and further it is preferable that the event information includes match elapsed time information showing progress of the match.

In order to make it possible for the user to preferably grasp development of the match of the summarized contents, it is preferable that the contents summary information output by the contents summary information outputting part is sorted based on an order of the hierarchical structure or the match elapsed time.

In addition, as a preferable summarizing portion of the contents, it is preferable that the event information is so arranged to include at least either one of score information that shows a score or a record, or play event information that shows a characteristic motion of each player.

In order to provide the user with the contents summary information by compiling it within a time period requested to watch by the user, it is preferable that the user information receiving part is so arranged to receive the time period requested to watch by the user, that a summary time period checking part that compares the time period requested to watch by the user received by the user information receiving part with a total time period of the contents summary information output by the contents summary information outputting part is arranged, and if the summary time period checking part judges that the time period requested to watch by the user is smaller than the total time period of the contents summary information, the contents summary information outputting part compiles the contents summary information to be summarized within the time period requested to watch by the user based on the interest and/or preference of the user received by the user information receiving part and outputs it.

Furthermore, in order to grasp which player developed the match advantageously, it is preferable that a leading degree information producing part that compares score information of one player with score information of the other player at an arbitrary elapsed time of the match based on the score information and produces leading degree information that expresses a leading degree during development of the match between the above-mentioned one player and the other player is arranged, and that the inside expressing information producing part produces the inside expressing information based on the leading degree information, and furthermore it is preferable that the leading degree information is information wherein leading degree information at the arbitrary elapsed time of the match is cumulated.

In order to obtain contents summary information that concretely corresponds to an interest or preference of a user such as a scene including a motion of a player who scored a point just before the match is ended or a scene that is summarized with centering on a focused player, it is preferable that the surface sentence information producing part produces the surface sentence information by classifying it into surface sentence match development information in association with the development of the match expressed by the inside expressing information and surface sentence player motion information in association with the distinguished motion of the player.

As a preferable mode of the present claimed invention represented is a contents summarizing unit that extracts a characteristic motion of a player that shows development of a match from contents regarding sports of a program that is on the air, of a material image prior to broadcasting, or of an image recorded by a recording media such as a video tape recorder and summarizes it in a required time period so that it can be watched in the required time period, and characterized by comprising an event information obtaining part that obtains score information showing a point or a record and play event information showing a characteristic motion of each player as being event information from the above-mentioned contents, a leading degree information producing part that compares score information of one player with score information of the other player at an arbitrary elapsed time of the match based on the score information and produces leading degree information that expresses a leading degree during development of the match between the above-mentioned one player and the other player, an inside expressing information producing part that produces inside expressing information describing an outline of the development of the match based on the leading degree information, a surface sentence information producing part that produces surface sentence information expressed by a sentence that summarizes the contents based on the inside expressing information, and a contents summary information outputting part that outputs contents summary information wherein the surface sentence information is associated with image information corresponding to the event information.

BRIEF DESCRIPTION OF THE DRAWINGS

FIG. 3 is a diagram showing a stored state of a text element for summary in accordance with this embodiment.

FIG. 4 is a flow chart showing a process to produce contents summary information in accordance with this embodiment.

FIG. 7 is a flow chart showing a process to produce contents summary information in accordance with this embodiment.

BEST MODES OF EMBODYING THE INVENTION

First Embodiment

A first embodiment of the present claimed invention will be explained in detail with reference to FIG. 1 through FIG. 4, wherein contents regarding sports in accordance with this embodiment are tennis and contents summary information requested by a user is produced from recorded materials that have recorded a scene of a match between two players.

Figure 1:
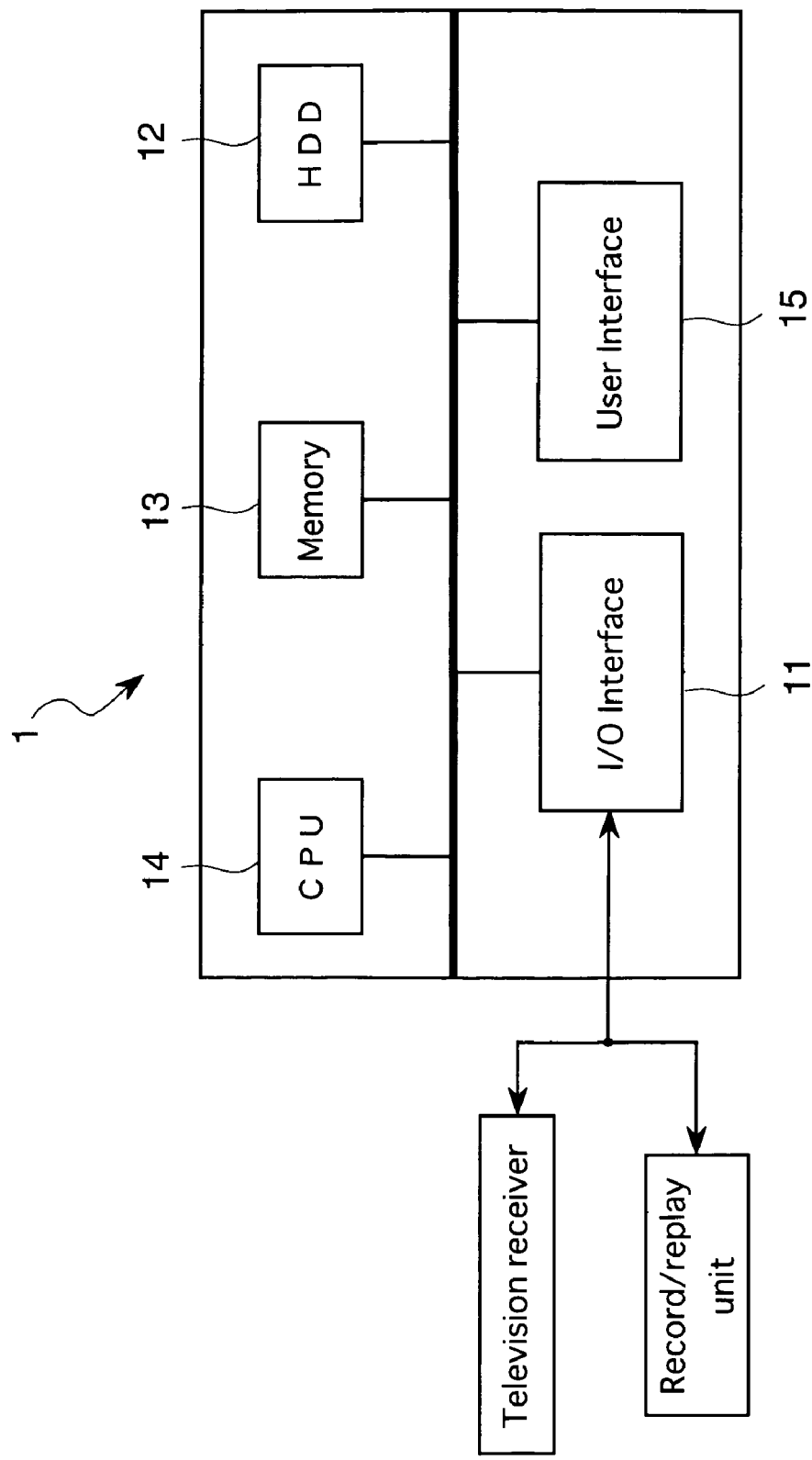
FIG. 1 is an equipment configuration diagram of a contents summarizing unit in accordance with an embodiment of the present claimed invention.
Figure 2:
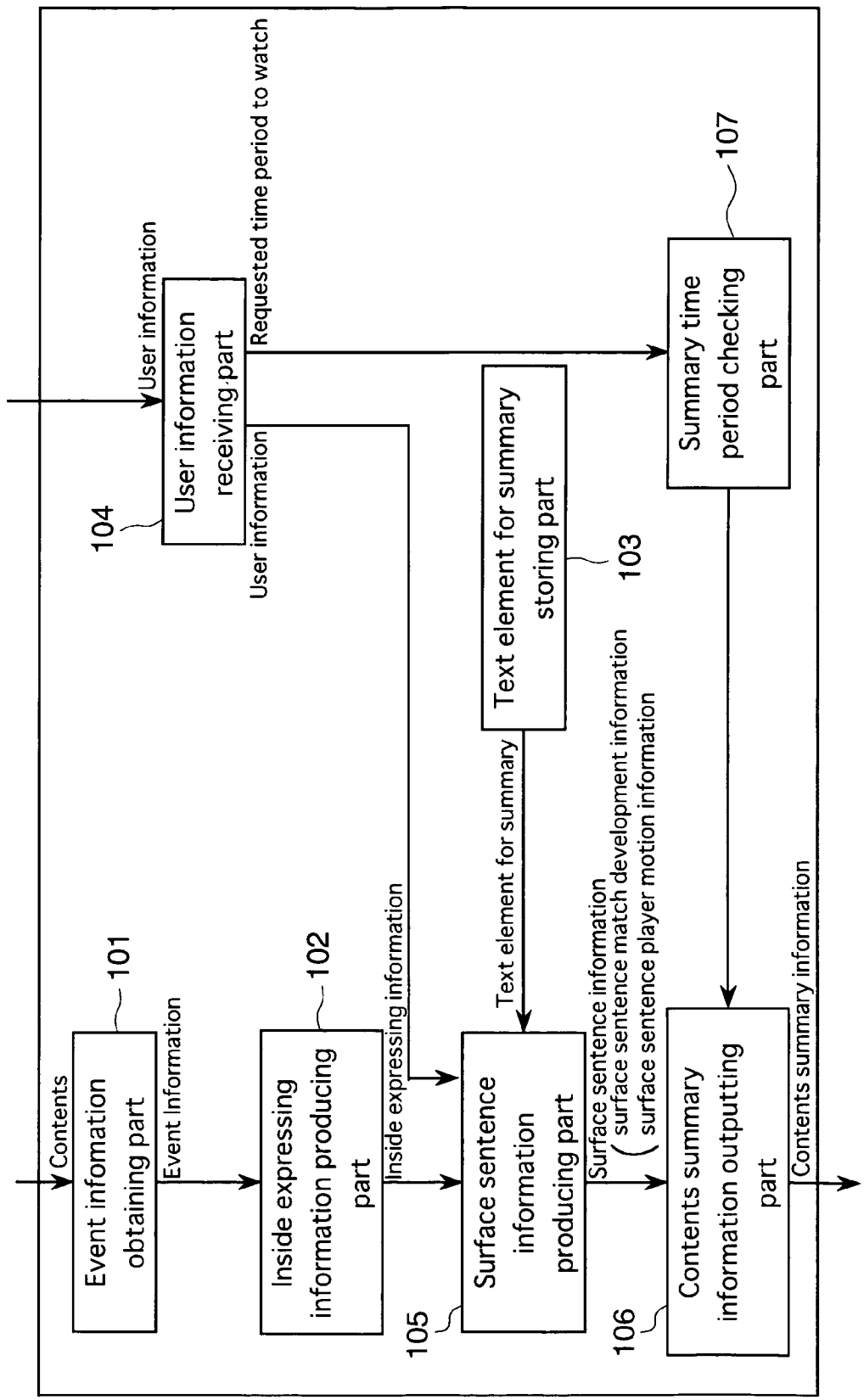
FIG. 2 is a functional block diagram in accordance with this embodiment.

FIG. 1 is an equipment configuration diagram showing an equipment configuration of a contents summarizing unit 1 in accordance with this embodiment. FIG. 2 is a functional block diagram in accordance with this embodiment.

The contents summarizing unit 1 in accordance with this embodiment extracts a characteristic motion of a player during the match from contents regarding sports of a program that is on the air by a television receiver, of a material image prior to broadcasting, or of an image recorded by a recording media such as a video tape recorder and produces contents summary information summarized into a requested time period, and mainly comprises, as shown in FIG. 1, an input/output interface 11 that is connected with a television receiver TV or a record/replay unit such as a video tape recorder, an external memory unit 12 or an internal memory 13 such as an HDD that memorizes data or programs, a CPU 14 that is activated in accordance with a program memorized in the external memory unit 12 or the like so as to work as the contents summarizing unit 1, and a user interface 15 such as a keyboard or a mouse that receives user information from a user. "Contents" here are set as a general tennis program that includes an image including a motion of a player, a shot filmed at an angle from above so that a tennis court is filmed longwise and a shot of a judge or audiences taken in close-up, and voice of commentators or the like.

Next, the contents summarizing unit 1 will be explained in terms of function. When the CPU 14 is activated, the contents summarizing unit 1 serves as, as shown in FIG. 2, an event information obtaining part 101, an inside expressing information producing part 102, a text element for summary storing part 103, a user information receiving part 104, a surface sentence information producing part 105, a contents summary information outputting part 106, and a summary time period checking part 107.

Each component will be explained.

The event information obtaining part 101 obtains event information that shows a characteristic motion of a player during a match from the contents and makes use of the input/output interface 11. In this embodiment, the event information is obtained by identifying a motion of the player such as a forehand stroke based on a positional relationship between the player and the ball extracted from image information of the contents by means of a binary image processing or the like. The obtained event information is so arranged to have, a hierarchical structure based on a unit that can describe a match such as a structure on a rule of the sports concerned or a motion of a player, and match elapsed time information that shows progress of the match, and output to the inside expressing information producing part 102.

The inside expressing information producing part 102 produces inside expressing information that describes an outline of the match based on the event information. More concretely, for example, a characteristic motion of a player such as a service ace or a double fault is evaluated with respect to each game or each set, and inside expressing information regarding development of the match such as "The game had a lot of service aces", or "The set had a lot of double faults" is produced.

The text element for summary storing part 103 stores a text element for summary consisting of phrases that can express development of a match or a motion of a player of the contents and is formed by making use of a predetermined area of the external memory unit 12 and the internal memory 13. In this embodiment, the text element for summary is stored in correspondence with a text element for summary ID that shows a unique value in this contents summarizing unit 1, as shown in FIG. 3.

The user information receiving part 104 receives user information that shows an interest or preference of a user such as a contents structure regarding contents of the match that the user requests to watch in a summarized state, a player on which the user focuses attention in order to designate a player or a team upon which the user places emphasis, or a summary time period that shows a time period that the user requests to watch in a summarized state, and the user information receiving part 104 is composed by making use of the user interface 15.

The surface sentence information producing part 105 produces surface sentence information expressed by a sentence that summarizes the contents based on the text element for summary and the user information. In addition, on an occasion when the surface sentence information is produced, an expression that centers on the above-mentioned focused player is used based on the user information. As a result, the surface sentence information is formed by being expressed from a view point of the designated player or team.

The contents summary information outputting part 106 outputs contents summary information wherein the surface sentence match development information and the surface sentence player motion information are associated with image information in correspondence with the event information to the television receiver TV. As an image in association with the surface sentence match development information, a scene including the last stroke event of the player who gets a point just before the end of the set or the game, or a scene including a motion event that happens most frequently in all games that are judged as a close game or a one-sided game is set to be selected from each set. In addition, as an image in association with the surface sentence player motion information, motions similar to a super play such as a passing shot or a service ace are placed in an order in advance and the development of the match and a motion event of a player corresponding to the focused player are set to be selected from each set in an ascending order. Furthermore, a scene with which the designated player or team is mainly associated is weighted and selected from image scenes including a characteristic event. In addition, in this embodiment, the contents summary information is set to be output in an order of a hierarchical structure that shows a unit that can describe the match such as a structure of a rule of the sports concerned or the motion of the player, or the match elapsed time information that shows progress of the match in a sorted manner.

The summary time period checking part 107 compares the time period requested by the user that is received by the user information receiving part 104 with total time period of the contents summary information output by the contents summary information outputting part 106, and in case that the summary time period checking part 107 judges that the time period requested by the user is smaller than the total time period of the contents summary information, the summary time period checking part 107 gives an instruction to the contents summary information outputting part 106 to compile the contents summary information based on the interest and preference of the user received by the user information receiving part 104 so that the contents summary information can be summarized within the time period requested by the user and output it to the contents summary information outputting part 106.

Next, a movement of the contents summarizing unit 1 in accordance with this embodiment will be explained by the use of a flow chart shown in FIG. 4.

FIG. 4 is a flow chart that shows a process to produce contents summary information requested by a user from a recorded material where a match between players Oka and Hinomura who are playing a tennis match is recorded.

First, when the event information obtaining part 101 obtains event information from the recorded material that is replayed by the record/replay unit (Step S101), the inside expressing information producing part 102 produces inside expressing information that expresses development of the match (Step S102). The surface sentence information producing part 105 produces surface sentence information based on the inside expressing information, the user information received by the user information receiving part 104, and the text element for summary stored in the text element for summary storing part 103 (Step S103). More concretely, in this step S103, if the received user information is, for example, contents configuration=place emphasis upon a service ace, a focused player=Oka, and summary time period=30 (sec), surface sentence player motion information, wherein an emphasis is placed upon the service ace and attention is focused on the player Oka, is produced such as "In the first set ("dai ichi set ha")", "Oka scored service aces successively", "the player Oka won the set 6-2 without precariousness.", "Although Hinomura scored a service ace in the second set" "development of the set was almost close" "the player Oka finally won the set 6-4.". In the produced surface sentence information "In the first set ("dai ichi set ha")", each of "dai" "set" "ha" is produced with reference to the text element for abstract ID000, 001, 009 respectively. In addition, if the user information is content configuration=place emphasis upon a double fault, a focused player=Oka, and summary time period=30 (sec), surface sentence player motion information, wherein an emphasis is placed upon a characteristic motion and attention is focused on the player Oka, is produced such as "Although the first set began with Oka's double fault", "Hinomura double faulted successively", "the player Oka won the set 6-2 without precariousness.", "Although Oka's double faults were distinguished in the second set,", "Oka played stably without double fault in the last half", "the player Oka finally won the set 6-4.".

As mentioned above, the contents summary information outputting part 106 compiles the contents summary information with which the image information corresponding to the event information is associated based on the surface sentence information produced by the surface sentence producing part 105 (Step S104), and the summary time period checking part 107 compares the time period requested by the user to watch received by the user information receiving part 104 with the total time period of the contents summary information output by the contents summary information outputting part 106, and in case that the summary time period checking part 107 judges that the time period requested by the user is bigger than the total time period of the contents summary information (Step S105), the contents summary information which the image information corresponding to the event information is associated with is output to the television receiver TV and so on (Step S106), and in case that the summary time period checking part 107 judges that the time period requested by the user is smaller than the total time period of the contents summary information (Step S105), the contents summary information outputting part 106 compiles the contents summary information based on the interest and preference of the user received by the user information receiving part 104 so that the contents summary information can be summarized within the time period requested by the user (Step S104). In addition, when the contents summary information is replayed, the surface sentence information (corresponding to one line enclosed by " " in the above-mentioned example) is displayed in sync with each image scene corresponding to the surface sentence information on the television receiver TV and a digested version can be watched.

In accordance with the above-mentioned contents summarizing unit 1, since the inside expressing information producing part 102 produces the inside expressing information that expresses an outline of the development of the match of the event information such as a characteristic motion of the player during the match obtained by the event information obtaining part 101, the surface sentence information producing part 105 produces the surface sentence information expressed by a sentence that summarizes the contents based on the inside expressing information, and the contents summary information outputting part 106 outputs the contents summary information wherein the surface sentence information is associated with the image information corresponding to the event information, it is possible to provide the contents summarizing unit 1 that produces the contents summary information including semantic contents that the motion of the player at an arbitrary time period during the match or a state of the match can be grasped or the development of the match as the summarized contents can be preferably grasped.

In addition, if a focused player received by the user information receiving part 104 is changed, it is possible to effectively produce and provide the contents summary information having summarized contents in accordance with the preference of the user with keeping a current of the context by reference to the text element for summary receiving part 103.

Furthermore, it is possible for the user to enjoy the summarized contents within a time period that the user hopes to watch.

In this embodiment, the contents to be summarized is tennis, however, it may be other sports such as badminton or pingpong.

In addition, in this embodiment, the contents summary information is output to the television receiver TV, however, it is not limited to this and other output method may be conceived that the contents summary information is output to a record/replay unit such as a video tape recorder and so on and recorded by a proper recording media.

Second Embodiment

Figure 5:
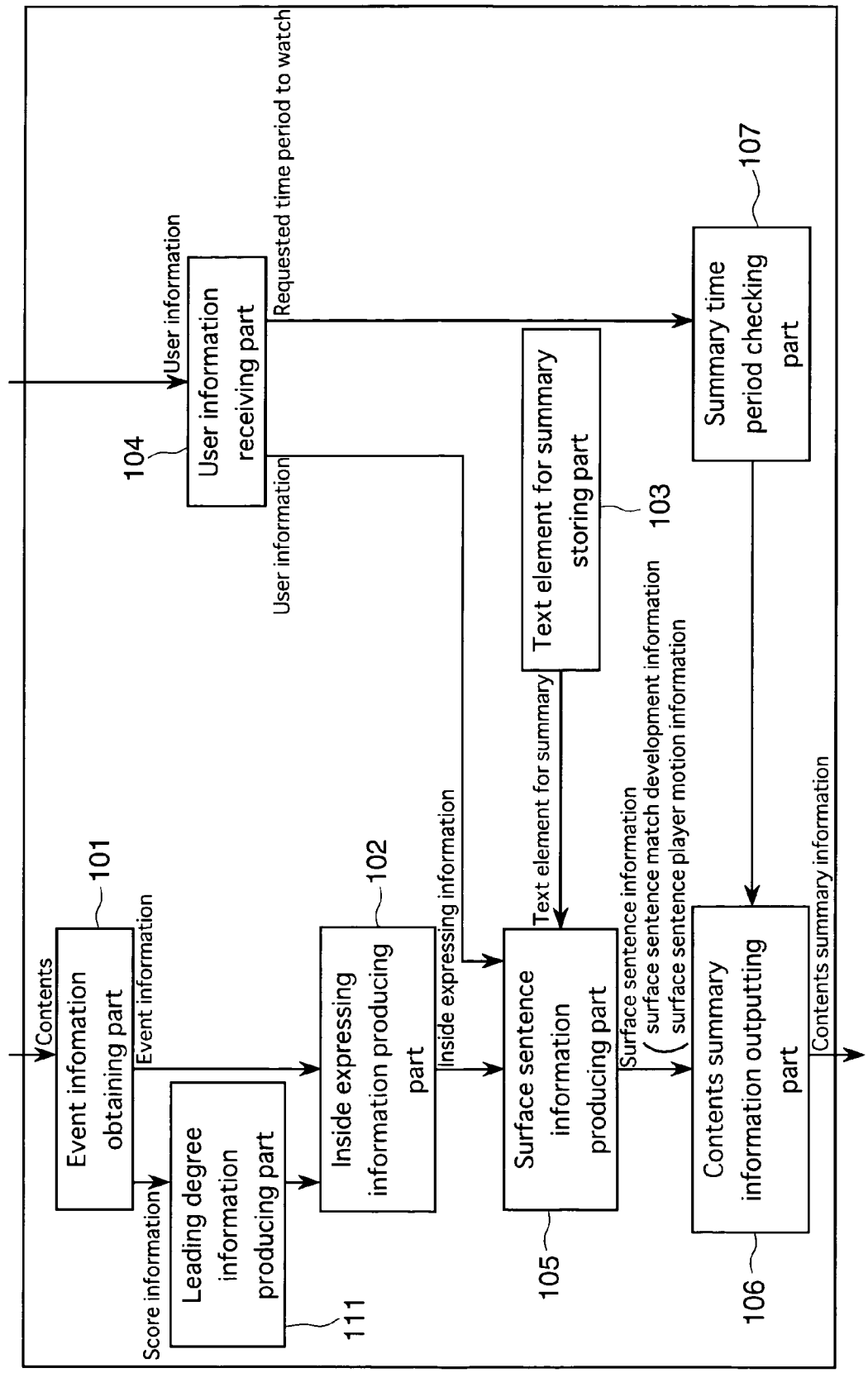
FIG. 5 is a functional block diagram of a contents summarizing unit in accordance another embodiment of the present claimed invention.

A second embodiment of the present claimed invention will be explained with reference to FIG. 5 through FIG. 7, wherein contents concerning sports of this embodiment are tennis and contents summary information requested by a user is produced from a program broadcasting a scene of a match between two players.

Since the contents summarizing unit 1 in accordance with this embodiment has the same arrangement as that of the contents summarizing unit 1 explained in the first embodiment, an explanation will be omitted. FIG. 5 is a functional block diagram of the contents summarizing unit 1 in accordance with this embodiment.

The contents summarizing unit 1 will be explained in terms of function. When the CPU 14 or the like is activated, the contents summarizing unit 1 serves as, as shown in FIG. 5, an event information obtaining part 101, a leading degree information producing part 111, an inside expressing information producing part 102, a text element for summary storing part 103, a user information receiving part 104, a surface sentence information producing part 105, a contents summary information outputting part 106, and a summary time period checking part 107.

Each component will be explained, wherein the same name and the same code is given to the component that produces the same operation and effect as that of the first embodiment and an explanation will be omitted.

The event information obtaining part 101 obtains event information such as a motion of a player showing characteristic development of a match and score information showing a point or a record from the above-mentioned contents and makes use of the input/output interface 11. In this embodiment also, the event information is obtained like the above-mentioned first embodiment by identifying a motion of a player such as a forehand stroke based on a positional relationship between the player and the ball extracted from the image information of the contents by means of a binary image processing or the like. The score information is obtained from the score displayed in the image input by hand. The obtained event information and score information are so arranged to have a hierarchical structure based on a unit that can describe a match such as a structure on a rule of the sports concerned or a motion of a player, and match elapsed time information that shows progress of the match, and is output to the leading degree information producing part 111 and the inside expressing information producing part 102.

The leading degree information producing part 111 compares the score information of one player with the score information of the other player at an arbitrary match elapsed time based on the score information obtained by the event information obtaining part 101 and produces leading degree information of a set or leading degree information of a game (hereinafter called "leading degree information") that shows a leading degree of a set or a game between one player and the other player. The leading degree information of the set is an index that shows which player develops the set advantageously at the arbitrary set and is defined in terms of an expression Ss=dsi/dsmax. Wherein dsi is a difference of a number of games between the winner and the loser when the winner wins the last one game of the set, and dsmax is a maximum difference of a number of games between the winner and the loser until the winner wins the last one game of the set. In addition, the leading degree information of the game is an index that shows which player plays the game advantageously at an arbitrary game and is defined in terms of an expression Sg=dgi/dgmax. Wherein dgi is a difference of a number of points between the winner and the loser when the winner scores the last one point of the game, and dgmax is a maximum difference of a number of points between the winner and the loser until the winner scores the last one point of the game.

Furthermore, cumulated leading degree information that can be obtained by cumulating the leading degree information of the game for each game at a time during a match is produced and which player develops the set or the game advantageously is shown. More concretely, the cumulated leading degree information is an index showing development of the match until a certain time and is defined in terms of an expression Sr=ΣSg. In this embodiment, the cumulated leading degree information is obtained by cumulating the leading degree information of the game, however, it may be obtained by cumulating the leading degree information of the set.

The inside expressing information producing part 102 analyses an outline of the development of the match from the leading degree of the match and its transition for each set or each game based on the leading degree information produced by the leading degree information producing part 111 and produces the inside expressing information that describes the outline of the development of the match.

More concretely, if the set leading degree information Ss is |Ss|≦0.2, the development of the match is analyzed to be close, if |Ss|≧0.6, the development of the match is analyzed to be one-sided, and if 0.2<|Ss|<0.6, the development of the match is analyzed to be plain, and the inside expressing information that describes the outline of the development of the set such as <1> whether the set was one-sided or not, <2> whether the set was close or not, or <3> whether the set was neither one-sided nor close, but plain or not is produced. For example, the leading degree information of the set that has ended up with 6-2 is Ss=⅗=0.6, and the inside expressing information showing that the development of the set was "one-sided" is produced.

If the game leading degree information Sg is |Sg|≦0.25, the development of the game is analyzed to be close, if |Sg|≧0.6, the development of the game is analyzed to be one-sided, and if 0.25<|Sg|<0.6, the development of the game is analyzed to be plain, and the inside expressing information that describes the outline of the development of the game such as <1> whether the game was one-sided or not, <2> whether the game was close or not, or <3> whether the game was neither one-sided nor close, but plain or not is produced. For example, the game leading degree information that has ended up with the second deuce is 40-A (4-5, if converted into a score), thereby to be Sg=⅕=−0.2, and the inside expressing information showing that the development of the game was "close" is produced. Minus in each leading degree shows that the other player is advantageous.

Figure 6:
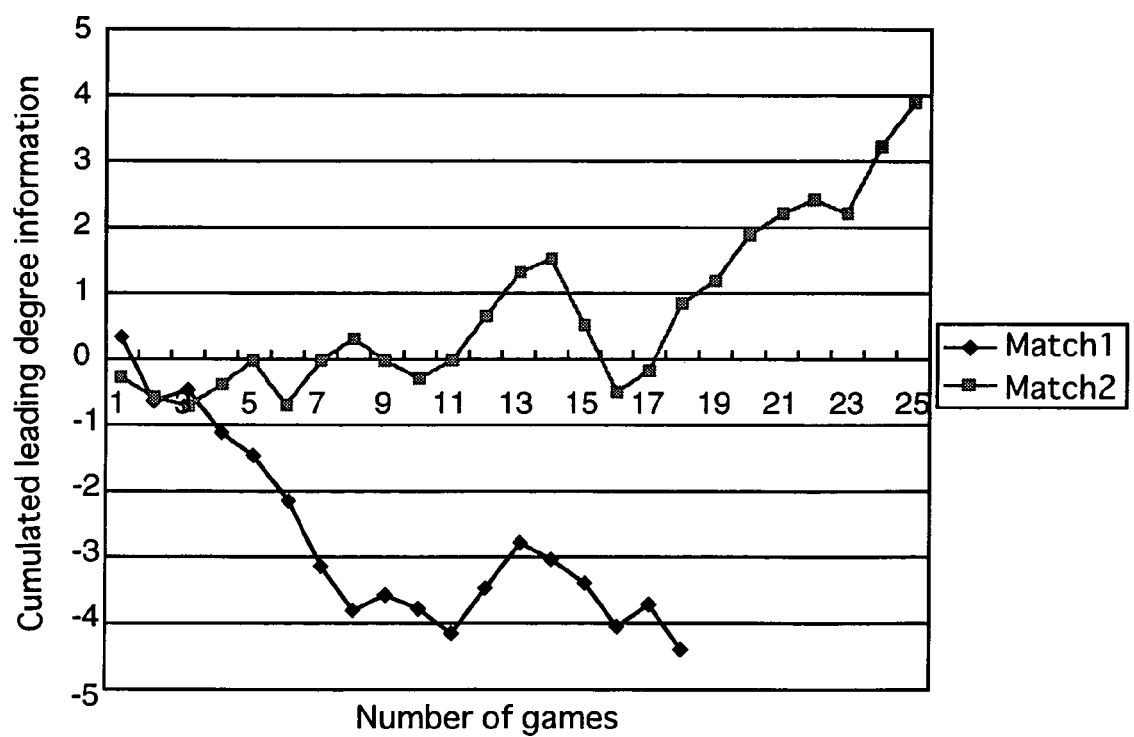
FIG. 6 is a diagram of cumulative dominant degree information that is graphed out in accordance with this embodiment.

In addition, the cumulated leading degree information produces the inside expressing information that describes the outline of the development of the match such as <1> whether the development of the set is maintained during whole of the set or not, <2> whether the development of the match changes during the first half•the last half or not, is produced based on, for example, an inclination in a graph, as shown in FIG. 6, wherein the leading degree information of the game for each game is cumulated and displayed. More concretely, in FIG. 6, inside expressing information showing that a player at a minus side develops the first half of the match 1 advantageously and the player a the minus side develops the last half of the match 1 completely in a one-sided manner is produced for the match 1. At the same time period, inside expressing information showing that the match 1 is almost in an even state during the first half of the match 2, a player at a plus side temporarily develops the match 1 advantageously and after that the player at the minus side develops the middle part of the match 1 advantageously, and the player at the plus side develops the last half of the match 2 advantageously is produced for the match 2.

The surface sentence information producing part 105 produces surface sentence information expressed by a sentence that summarizes the contents based on the text element for summary and the user information. In this embodiment, two kinds of the surface sentence information are produced for each set; surface sentence match development information that is associated with the development of the match expressed by the inside expressing information and surface sentence player motion information that is associated with a distinguished motion of the player, and for example, in case that the development of the first set is generally one-sided, the surface sentence match development information such as "The player Oka won the first set 6-2 without precariousness." or the surface sentence player motion information such as "Although a passing shot or a serve-and-volley is scored" is produced. In addition, an expression centering on the focused player is used based on the user information in producing the surface sentence information. As a result, the surface sentence information is formed by being expressed in terms of the designated player or team.

Next, a performance of the contents summarizing unit 1 in accordance with this embodiment will be explained with reference to the flow chart shown in FIG. 7.

FIG. 7 is a flow chart showing a process of producing contents summary information requested by a user from a program wherein a match between the tennis players Oka and Hinomura is broadcasted.

First, when the event information obtaining part 101 obtains the event information and the score information from an on-air program broadcasted on the television receiver (Step S201), the leading degree information producing part 111 produces the set leading degree information, the game leading degree information, and the cumulated leading degree information that is made by cumulating the game leading degree information for each game (Step S202). Next, the inside expressing information producing part 102 produces the inside expressing information that expresses the development of the match based on the set leading degree information, the game leading degree information, the cumulated leading degree information, and the event information (Step S203). The surface sentence producing part 105 produces the surface sentence information based on the inside expressing information, the user information received by the user information receiving part 104, and the text element for summary stored in the text element for summary storing part 103 (Step S204).

In this step S204, if the user information is, for example, contents configuration=place emphasis upon development of the match, a focused player=Oka, and summary time period=30 (sec), surface sentence match development information, wherein an emphasis is placed upon the development of the match and attention is focused on the player Oka, is produced such as "In the first set ("dai ichi set ha")", "Oka developed the match in a one-sided manner", "the player Oka won the set 6-2 without precariousness.", "Although Hinomura tentatively developed the match advantageously in the second set" "development of the set was almost close" "the player Oka finally won the set 6-4.". In the produced surface sentence information "In the first set ("dai ichi set ha")", each of "dai" "set" "ha" is produced with reference to the text elements for abstract ID000, 001, 009 respectively. In addition, if the user information is content configuration=place emphasis upon a distinguished motion, a focused player=Oka, and summary time period=30 (sec), surface sentence player motion information, wherein an emphasis is placed upon a distinguished motion and attention is focused on the player Oka, is produced such as "In the first set, a pashing shot or", "serve and volley was scored, and ahead", "the player Oka won the set 6-2 without precariousness.", "In the second set Oka scored a service ace and,", "a stroke ace, but", "finally the player Oka won the set 6-4.". Furthermore, if the user information is content configuration=place emphasis upon a distinguished motion, a focused player=Hinomura, and summary time period=30 (sec), surface sentence player motion information, wherein an emphasis is placed upon a distinguished motion and attention is focused on the player Hinomura, is produced such as "In the first set, although Hinomura scored serve and volley and", "a service ace so that Hinomura showed a good play", "the player Oka won the set 6-2 without precariousness.", "In the second set, although Hinomura scored a pashing shot and," "a stroke ace so that Hinomura showed a good play", "the player Oka finally won the set 6-4."

As mentioned above, the contents summary information outputting part 106 compiles the contents summary information with which the image information corresponding to the event information is associated based on the surface sentence information produced by the surface sentence producing part 105 (Step S205), and the summary time period checking part 107 compares the time period requested by the user to watch received by the user information receiving part 104 with the total time period of the contents summary information output by the contents summary information outputting part 106, and in case that the summary time period checking part 107 judges that the time period requested by the user is bigger than the total time period of the contents summary information (Step S206), the contents summary information which the image information corresponding to the event information is associated with is output to the television receiver TV and so on (Step S207), and in case that the summary time period checking part 107 judges that the time period requested by the user is smaller than the total time period of the contents summary information (Step S206), the summary time period checking part 107 gives an instruction to the contents summary information outputting part 106 to compile the contents summary information based on the interest and preference of the user received by the user information receiving part so that the contents summary information can be summarized within the time period requested by the user and to output it (Step S205). In addition, when the contents summary information is replayed, the surface sentence information (corresponding to one line enclosed by " " in the above-mentioned example) is displayed in sync with each image scene corresponding to the surface sentence information on the television receiver TV so that the digested version can be watched.

In accordance with the above-mentioned contents summarizing unit 1, since the inside expressing information producing part 102 produces the inside expressing information that expresses the outline of the development of the match based on the event information such as the characteristic motion of the player that shows the development of the match or the score information obtained by the event information obtaining part 101, the surface sentence information producing part 105 produces the surface sentence information expressed by a sentence that summarizes the contents based on the inside expressing information, and the contents summary information outputting part 106 outputs the contents summary information wherein the surface sentence information is associated with the image information corresponding to the event information, it is possible to provide the contents summarizing unit 1 that produces the contents summary information including semantic contents such that which player developed the match advantageously can be precisely known easily without unnecessary manpower.

The method for obtaining the score information by the event information obtaining part is to input the score displayed on the image by hand in the above embodiment, however, it is not limited to this and may have an arrangement wherein a score is obtained by automatically analyzing the score displayed on the image or obtained based on acoustic information by a commentator or the like.

In addition, the leading degree information is produced based on the score information in the above embodiment, however, it is not limited to this and may be produced based on a combination of the score information and the acoustic information by a commentator and so on.

Furthermore, in the above embodiment, the characteristic motion of the player during the match is extracted from contents regarding sports of a program that is on the air by a television receiver, of a material image prior to broadcasting, or of an image recorded by a recording media such as a video tape recorder, or of a material recorded by a recording media, and summarized in the time period requested by the user so that it can be viewed within the time period, however, the media as being an object of the contents to be summarized is not-limited to this and may be such that a characteristic motion during a match is extracted from a material image of the sports filmed in a stadium prior to broadcasting or image information archived on the Internet and summarized in the time period requested by the user so that it can be viewed within the required time period.

Concrete arrangement of each part is not limited to the above-described embodiment and may be variously modified without departing from a spirit of the present claimed invention.

POSSIBLE APPLICATIONS IN INDUSTRY

As mentioned above, in accordance with the present claimed invention, since the inside expressing information producing part produces the inside expressing information that expresses the outline of the development of the match of the event information such as the characteristic motion of the player during the match obtained by the event information obtaining part, the surface sentence information producing part produces the surface sentence information expressed by the sentence that summarizes the contents based on the inside expressing information, and the contents summary information outputting part outputs the contents summary information wherein the surface sentence information is associated with the image information corresponding to the event information, it is possible to provide the contents summarizing unit that produces the contents summary information including semantic contents easily without unnecessary manpower.

The invention claimed is:

1. A contents summarizing unit that extracts a characteristic motion of a player during a match from contents regarding sports of a program that is on the air, of a material image prior to broadcasting, or of an image recorded by a recording media such as a video tape recorder and summarizes it in a required time period so that it can be watched in the required time period, and characterized by comprising an event information obtaining part that obtains event information such as the characteristic motion of the player during the match from the above-mentioned contents, an inside expressing information producing part that produces inside expressing information describing an outline of the match based on the event information, a surface sentence information producing part that produces surface sentence information expressed by a sentence that summarizes the contents based on the inside expressing information, and a contents summary information outputting part that outputs contents summary information, wherein the surface sentence information is associated with image information corresponding to the event information, wherein the surface sentence information is formed by being expressed from a view of point of a designated player or a team.

2. The contents summarizing unit described in claim 1, and characterized by that a user information receiving part that receives user information showing an interest or preference of a user is comprised and that the surface sentence information producing part produces the surface sentence information wherein the interest or preference of the user is reflected in the inside expressing information based on the user information.

3. The contents summarizing unit described in claim 1, and characterized by that a text element for summary storing part that stores a text element for summary comprising a word that can express the development of the match or the motion of the player of the contents concerned is comprised and that the surface sentence information producing part produces the surface sentence information based on the text element for summary.

4. The contents summarizing unit described in claim 1, and characterized by that the event information has a hierarchical structure based on a unit that can describe the match such as a structure on a rule of the sports concerned or the motion of the player.

5. The contents summarizing unit described in claim 4, and characterized by that the contents summary information output by the contents summary information outputting part is sorted based on an order of the hierarchical structure or the match elapsed time.

6. The contents summarizing unit described in claim 1, and characterized by that the event information includes match elapsed time information showing progress of the match.

7. The contents summarizing unit described in claim 1, and characterized by that the event information is so arranged to include at least either one of score information that shows a score or a record, or play event information that shows a characteristic motion of each player.

8. The contents summarizing unit described in claim 7, and characterized by that a leading degree information producing part that compares score information of one player with score information of the other player at an arbitrary elapsed time of the match based on the score information and produces leading degree information that expresses a leading degree during development of the match between the above-mentioned one player and the other player is comprised, and that the inside expressing information producing part produces the inside expressing information based on the leading degree information.

9. The contents summarizing unit described in claim 8, and characterized by that the leading degree information is information wherein leading degree information at the arbitrary elapsed time of the match is cumulated.

10. The contents summarizing unit described in claim 8, and characterized by that the surface sentence information producing part produces the surface sentence information by classifying it into surface sentence match development information in association with the development of the match expressed by the inside expressing information and surface sentence player motion information in association with the distinguished motion of the player.

11. The contents summarizing unit described in claim 1, and characterized by that the user information receiving part is so arranged to receive a time period requested to watch by the user, a summary time period checking part that compares the time period requested to watch by the user received by the user information receiving part with a total time period of the contents summary information output by the contents summary information outputting part is arranged, and if the summary time period checking part judges that the time period requested to watch by the user is smaller than the total time period of the contents summary information, the contents summary information outputting part compiles the contents summary information to be summarized within the time period requested to watch by the user based on the interest and/or preference of the user received by the user information receiving part and outputs it.

12. A contents summarizing unit that extracts a characteristic motion of a player that shows development of a match from contents regarding sports of a program that is on the air, of a material image prior to broadcasting, or of an image recorded by a recording media such as a video tape recorder and summarizes it in a required time period so that it can be watched in the required time period, and characterized by comprising an event information obtaining part that obtains score information showing a point or a record and play event information showing a characteristic motion of each player as being event information from the above-mentioned contents, a leading degree information producing part that compares score information of one player with score information of the other player at an arbitrary elapsed time of the match based on the score information and produces leading degree information that expresses a leading degree during the development of the match between the above-mentioned one player and the other player, an inside expressing information producing part that produces inside expressing information describing an outline of the development of the match based on the leading degree information, a surface sentence information producing part that produces surface sentence information expressed by a sentence that summarizes the contents based on the inside expressing information, and a contents summary information outputting part that outputs contents summary information wherein the surface sentence information is associated with image information corresponding to the event information, wherein the surface sentence information is formed by being expressed from a view of a designated player or team.

13. A contents summarizing program stored on a computer readable medium that activates a contents summarizing unit that extracts a characteristic motion of a player during a match from contents regarding sports of a program that is on the air, of a material image prior to broadcasting, or of an image recorded by a recording media such as a video tape recorder and summarizes it in a required time period so that it can be watched in the required time period by operating a computer, and characterized by making the computer serve as an event information obtaining means that obtains event information such as the characteristic motion of the player during the match from the above-mentioned contents, an inside expressing information producing means that produces inside expressing information describing an outline of the match based on the event information, a surface sentence information producing means that produces surface sentence information expressed by a sentence that summarizes the contents based on the inside expressing information, and a contents summary information outputting means that outputs contents summary information wherein the surface sentence information is associated with image information corresponding to the event information, wherein the surface sentence information is formed by being expressed from a view point of a designated player or a team.

14. A contents summarizing program stored on a computer readable medium that activates a contents summarizing unit that extracts a characteristic motion of a player that shows development of a match from contents regarding sports of a program that is on the air, of a material image prior to broadcasting, or of an image recorded by a recording media such as a video tape recorder and summarizes it in a required time period so that it can be watched in the required time period by operating a computer, and characterized by making the computer serve as an event information obtaining means that obtains score information showing a point or a record and play event information showing a characteristic motion of each player as being event information from the above-mentioned contents, a leading degree information producing means that compares score information of one player with score information of the other player at an arbitrary elapsed time of the match based on the score information and produces leading degree information that expresses a leading degree during development of the match between the above-mentioned one player and the other player, an inside expressing information producing means that produces inside expressing information describing an outline of the development of the match based on the leading degree information, a surface sentence information producing means that produces surface sentence information expressed by a sentence that summarizes the contents based on the inside expressing information, and a contents summary information outputting means that outputs contents summary information wherein the surface sentence information is associated with image information corresponding to the event information, wherein the surface sentence information is formed by being expressed from a view point of a designated player or a team.

* * * * *